(12) United States Patent
Kikuchi et al.

(10) Patent No.: US 10,272,835 B2
(45) Date of Patent: Apr. 30, 2019

(54) ILLUMINATION DEVICE FOR A CUP HOLDER IN A VEHICLE

(71) Applicants: CALSONIC KANSEI CORPORATION, Saitama (JP); STANLEY ELECTRIC CO., LTD., Tokyo (JP)

(72) Inventors: Masami Kikuchi, Saitama (JP); Shozo Maeno, Tokyo (JP); Takehiro Hamano, Tokyo (JP)

(73) Assignees: Calsonic Kansei Corporation, Saitama (JP); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 15/564,504
(22) PCT Filed: Apr. 4, 2016
(86) PCT No.: PCT/JP2016/061010
§ 371 (c)(1),
(2) Date: Oct. 5, 2017
(87) PCT Pub. No.: WO2016/167150
PCT Pub. Date: Oct. 20, 2016

(65) Prior Publication Data
US 2018/0079357 A1   Mar. 22, 2018

(30) Foreign Application Priority Data
Apr. 15, 2015   (JP) .................. 2015-083481

(51) Int. Cl.
*B60Q 3/20*   (2017.01)
*B60Q 3/64*   (2017.01)
(Continued)

(52) U.S. Cl.
CPC ................. *B60Q 3/64* (2017.02); *B60N 3/00* (2013.01); *B60N 3/10* (2013.01); *B60Q 3/20* (2017.02);
(Continued)

(58) Field of Classification Search
CPC ............... B60N 3/10; B60Q 3/20; B60Q 3/64
(Continued)

(56) References Cited

U.S. PATENT DOCUMENTS

2008/0266853 A1*  10/2008  Goto .................... G02B 6/0006
                                                                  362/240
2012/0075842 A1*   3/2012  Goto ..................... B60N 3/101
                                                                  362/154
(Continued)

FOREIGN PATENT DOCUMENTS

CN       105263752       1/2016
JP       2002-120630     4/2002
(Continued)

OTHER PUBLICATIONS

International Search Report dated Jun. 7, 2016 in International (PCT) Application No. PCT/JP2016/061010.

*Primary Examiner* — Diane I Lee
*Assistant Examiner* — Keith G. Delahoussaye
(74) *Attorney, Agent, or Firm* — Wenderoth, Lind & Ponack, L.L.P.

(57) ABSTRACT

An illumination device for a vehicle includes a light guide body having a light entrance hole from which light from a light source enters, and an emission portion that emits the light which has entered from the light entrance hole toward an outer surface from a position of an outer rim part. A light shielding member covers the outer surface of the light guide body except the emission portion, and a light directing member disposed in the light entrance hole reflects the light from the light source toward the emission portion.

7 Claims, 6 Drawing Sheets

(51) Int. Cl.
*B60N 3/00* (2006.01)
*B60N 3/10* (2006.01)
*F21V 8/00* (2006.01)
*B60R 7/06* (2006.01)

(52) U.S. Cl.
CPC .......... *G02B 6/009* (2013.01); *G02B 6/0031* (2013.01); *G02B 6/0055* (2013.01); *G02B 6/0091* (2013.01); *B60R 7/06* (2013.01)

(58) Field of Classification Search
USPC ........................................................ 362/511
See application file for complete search history.

(56) References Cited

U.S. PATENT DOCUMENTS

| | | | |
|---|---|---|---|
| 2016/0046233 A1* | 2/2016 | Hansen | B60N 3/101 362/509 |
| 2016/0054505 A1 | 2/2016 | Scavino et al. | |

FOREIGN PATENT DOCUMENTS

| | | |
|---|---|---|
| JP | 2005-319935 | 11/2005 |
| JP | 2006-69356 | 3/2006 |
| JP | 2008-34124 | 2/2008 |
| JP | 2010-244973 | 10/2010 |
| JP | 2015-229455 | 12/2015 |
| WO | 2014/155350 | 10/2014 |
| WO | 2014/165597 | 10/2014 |

* cited by examiner

ILLUMINATION DEVICE FOR A CUP HOLDER IN A VEHICLE

TECHNICAL FIELD

This invention relates to an illumination device for a vehicle and a cup holder.

BACKGROUND ART

Interior parts such as a cup holder are provided inside an interior of a vehicle such as an automobile (see, JP2002-120630A, for example).

An illumination device (illumination device for vehicle) is attached to the interior part such as the cup holder to illuminate an inside of the interior part. This illumination device includes a light guide body that guides light from a light source. It has been considered to set and adjust an illumination condition and an illumination effect with a light shielding member provided in an upper portion (outer surface) of the light guide body to cover the light guide body.

When the light shielding member is provided above the light guide body, however, the light from the light source entering the light guide body may be disturbed by the light shielding member. For this reason, it is necessary to well design a light entrance portion.

It is, therefore, an object of the present invention is to solve the above problem.

SUMMARY OF THE INVENTION

To achieve the above object, the present invention provides an illumination device for a vehicle, including a light guide body having a light entrance hole from which light from a light source enters, and an emission portion that emits the light which has entered from the light entrance hole toward an outer surface from a position of an outer rim part. A light shielding member covers the outer surface of the light guide body except the emission portion, and a light entrance member is disposed in the light entrance hole to reflect the light from the light source toward the emission portion.

According to the present invention, the light entering the light guide body can be prevented from being disturbed by the light shielding member.

DETAILED DESCRIPTION OF THE INVENTION

Hereinafter, an embodiment is described with reference to the drawings. FIGS. 1 to 7 are views for describing the embodiment.

First Embodiment

A configuration of the embodiment is described below.

Figure 1:
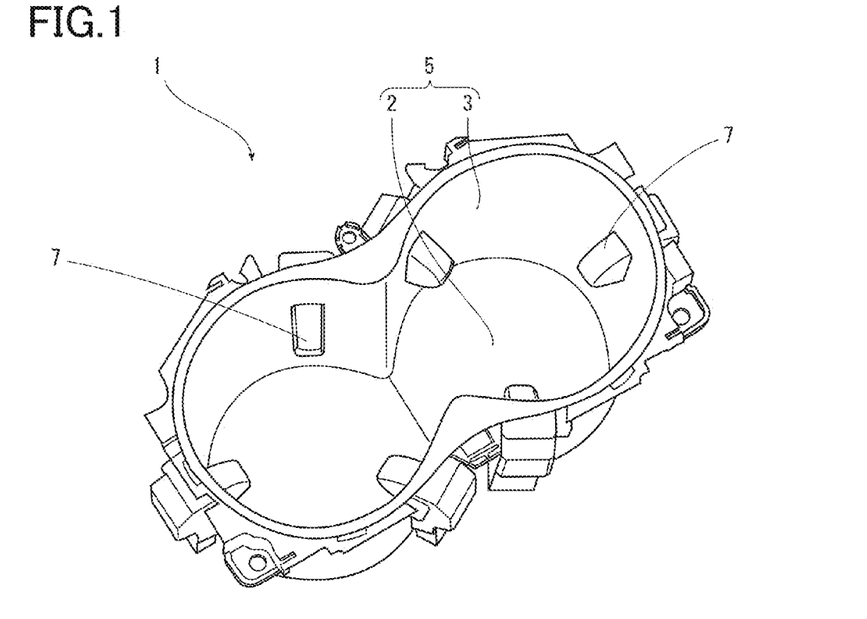
FIG. 1 is a perspective view illustrating a cup holder according to an embodiment.
Figure 2:
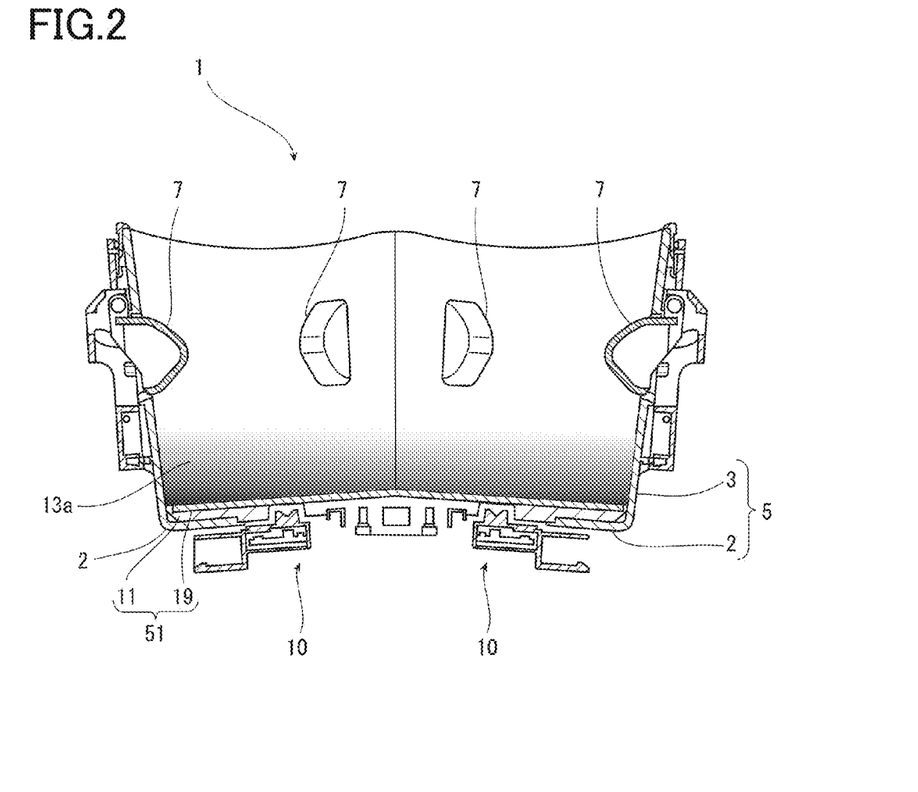
FIG. 2 is a vertical sectional view of FIG. 1.

An interior part such as a cup holder 1 as illustrated in the perspective view of FIG. 1 and the vertical sectional view of FIG. 2 is provided inside an interior of a vehicle such as an automobile. This cup holder 1 includes a cup holder main body 5 having a bottom 2 and a side wall 3. The cup holder main body 5 is a container capable of housing a drink container 4.

The cup holder 1 includes two compartments in which the two drink containers 4 are housed in parallel, respectively. This cup holder 1 is provided in a center console disposed between a driver's seat and a passenger's seat. A movable flap 7 capable of pressing and holding a side surface of the drink container 4 is attached to the side wall 3 of the cup holder main body 5 to be movable in the projection direction and a direction opposite to the projection direction. The movable flap 7 is biased in a projecting direction by a not-shown biasing device. However, the configuration of the cup holder 1 is not limited to the above configuration.

An illumination device 10 (illumination device for vehicle) is attached to the interior part such as the cup holder 1 to illuminate an inside of the cup holder 1. Although the interior part to which such an illumination device 10 is attached is not limited to the cup holder 1, this embodiment describes an example in which the illumination device 10 is attached to the cup holder 1.

Figure 3:
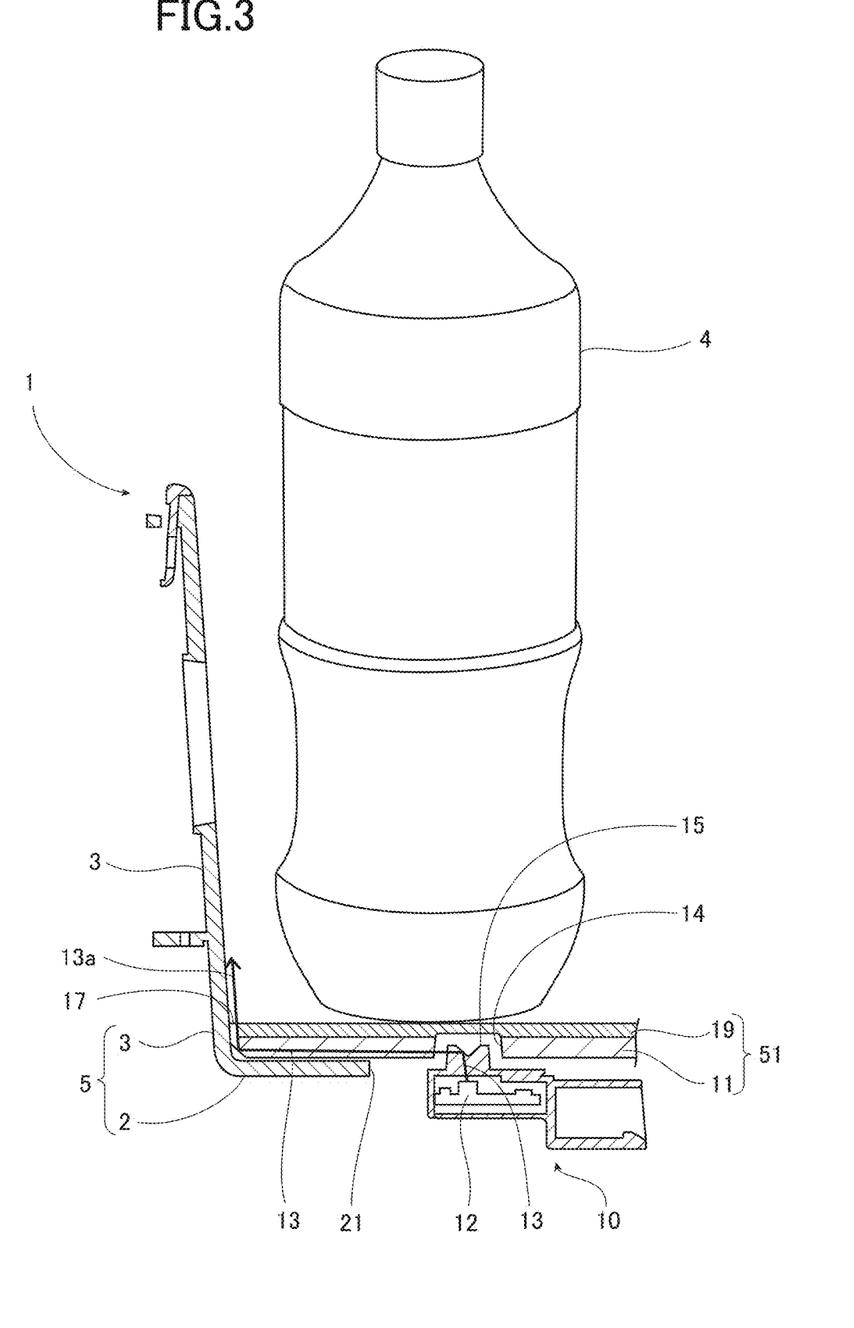
FIG. 3 is a partially enlarged sectional view of FIG. 2 illustrating a housed drink container.
Figure 4:
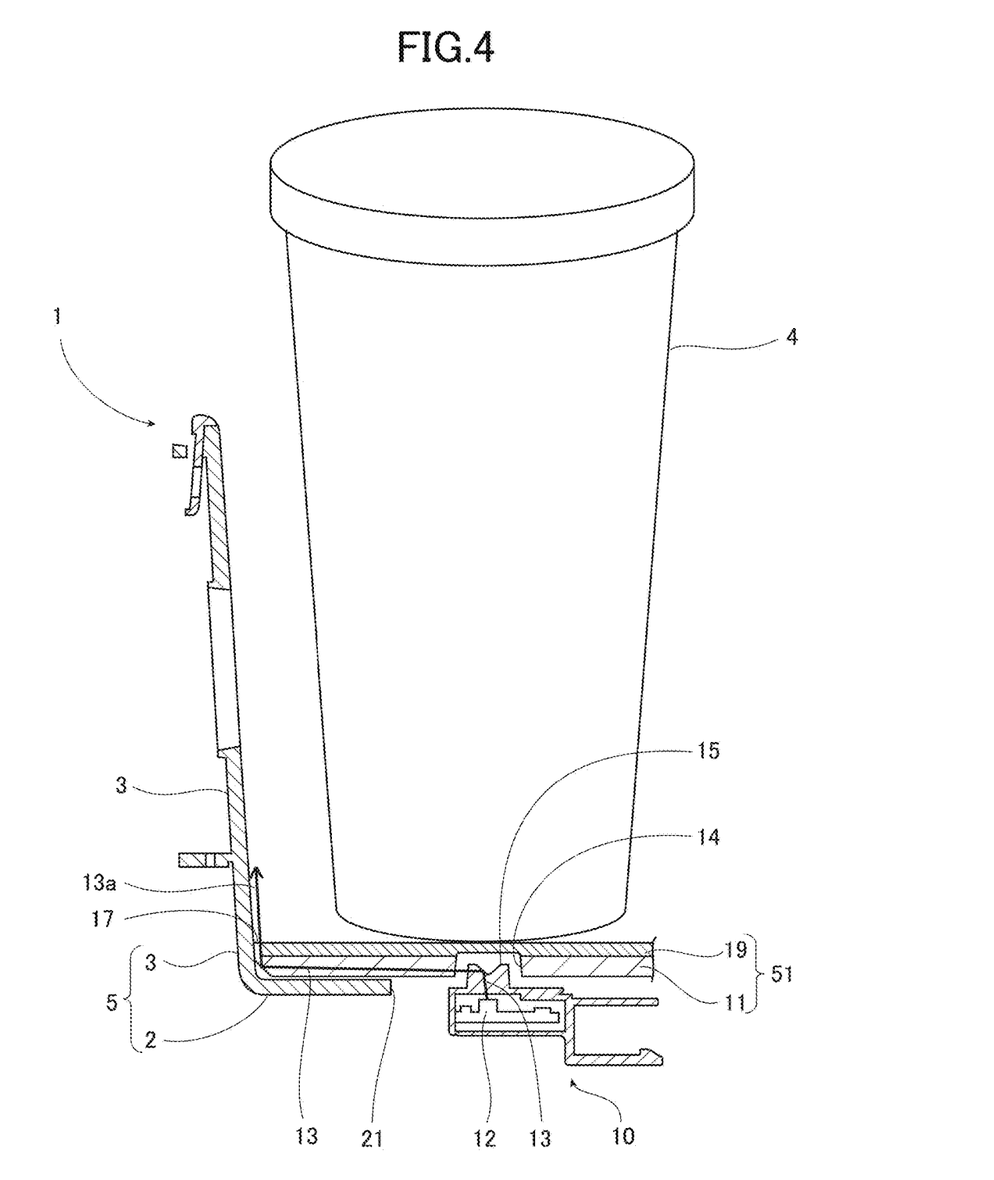
FIG. 4 is a partially enlarged sectional view of FIG. 2 illustrating another housed drink container.
Figure 5:
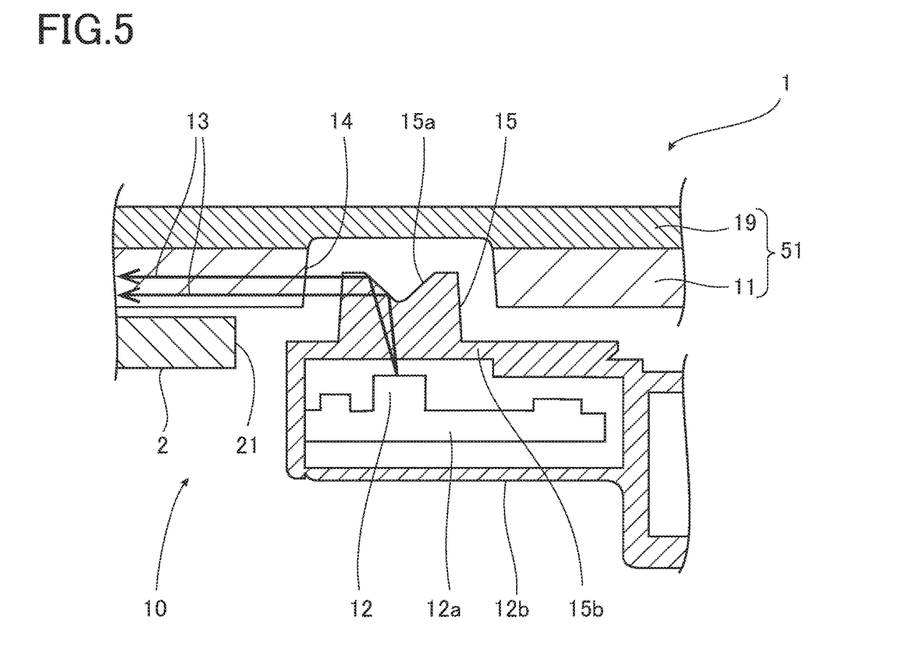
FIG. 5 is an enlarged sectional view of a center part of a bottom of the cup holder.

As illustrated in FIGS. 3, 4 (also refer to partially enlarged views of FIGS. 5, 6), the illumination device 10 includes a light guide body 11, a light shielding member 19, and a light entrance member (light directing member) 15. The light guide body 11 has a light entrance hole 14 from which light 13 from a light source 12 enters and an emission portion 17 from which the light 13 from the light entrance hole 14 emits toward an outer surface from a position of an outer rim part. The light shielding member 19 covers the outer surface 20 (top surface) of the light guide body 11 except the emission portion 17. The light entrance member (light directing member) 15 is inserted into the light entrance hole 14 to reflect the light 13 from the light source 12 toward the emission portion 17. As illustrated in FIGS. 3-5, the light directing member 15 is inserted into the light entrance hole 14 so as to be spaced apart from the light guide body The illumination device 10 is preferably attached to an illumination attachment portion (bottom part of cup holder main body 5) including two surfaces (for example, bottom 2 and side wall 3) each having a different angle to cover a first surface (bottom 2) with the light shielding member 19. With this configuration, indirect illumination (in this case, illumination from bottom) which forms a band of the light 13 (refer to illumination light 13a in FIG. 2) extending from the border between the first surface (bottom 2) and the second surface (side wall 3) along the second surface (side wall 3) can be achieved. In this case, the illumination light 13a generates gradation in which the light volume is gradually reduced upward.

For example, an LED is used for the light source 12. It is preferable to provide the light source 12 in the center of the light guide body 11 or around the center of the light guide body 11 to equally disperse the light 13. The light source 12 is attached to a base plate 12a to be housed in a base plate casing 12b (see FIG. 5).

The light entrance hole 14 is positioned approximately above the light source 12. In this case, the light entrance hole 14 is provided inside the light guide body 11, for example, in the center of the light guide body 11. An opening 21 (refer to FIG. 3) into which the light directing member 15 is inserted is formed in the bottom 2 of the illumination attachment portion (bottom part of cup holder main body 5) in accordance with the light entrance hole 14.

Figure 6:
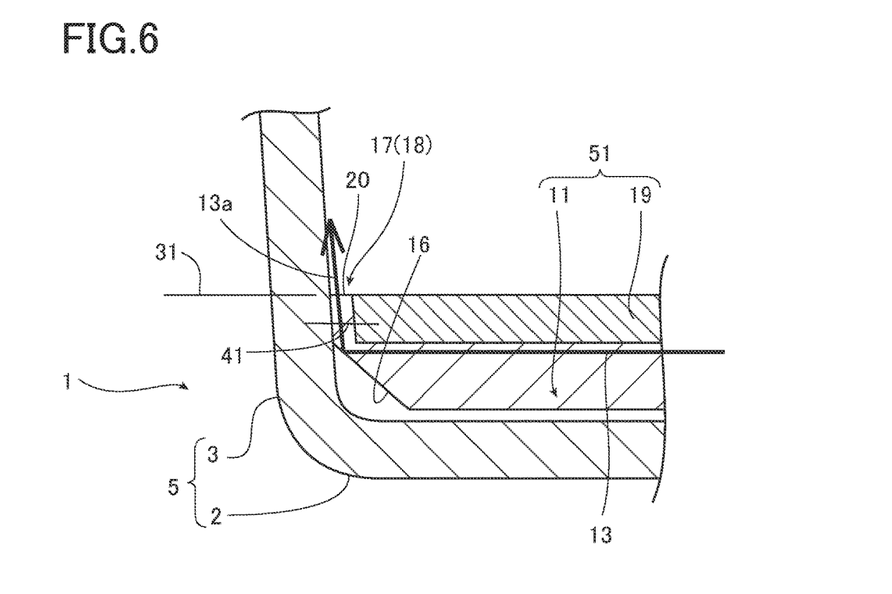
FIG. 6 is an enlarged sectional view of an outer circumference part of the bottom of the cup holder.

As illustrated in FIGS. 3, 4, and 6, the emission portion 17 is formed in an outer rim part (also generally identified with reference number 17) of the light guide body 11, and the outer surface 20 of the emission portion 17 is not covered by the light shielding member 19 attached to the light guide body 11. In this case, the emission portion 17 (in the outer rim part) projects upward from the end part of the light guide body 11, and the emission portion 17 is continuously provided along the end part of the light guide body 11. A reflection portion 16 configured to reflect light toward the emission portion 17 is formed in the light guide body 11. The reflection portion 16 is positioned under the emission portion 17 (end part of bottom of light guide body 11). The reflection portion 16 is formed by chamfering the end part of the light guide body 11. The chamfered reflection portion 16 is provided to reflect the light 13 from the light source 12 at an incident angle of 39° to 67.5°.

A light diffusion portion 18 that diffuses the emitting illumination light 13a to be equalized is provided on the outer surface 20 of the emission portion 17. The light diffusion portion 18 includes fine asperities such as a grain pattern.

Figure 7:
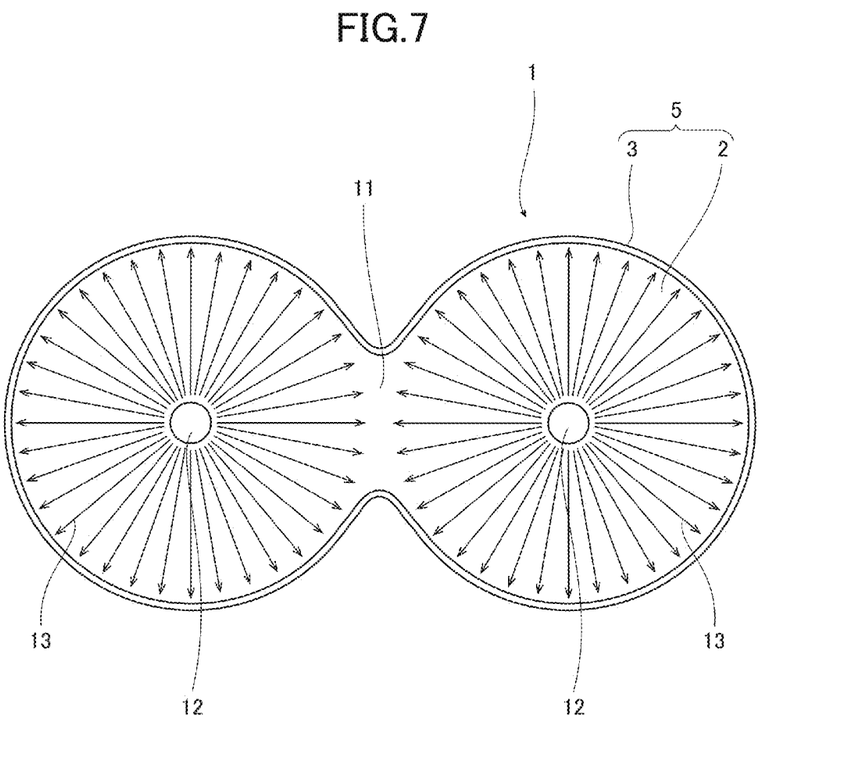
FIG. 7 is a top view of a light guide body.

The light guide body 11 is an approximate flat plate made of transparent resin such as acrylic or polycarbonate. The light guide body 11 is formed in accordance with the shape of the illumination attachment portion (bottom part of cup holder main body 5). In this case, as illustrated in FIG. 7, the light guide body 11 has the shape of a "figure eight" in a planar view in accordance with the shape of the cup holder main body 5. For example, the light source 12, the light directing member 15, and the light entrance hole 14 are provided in each center of the two compartments.

The light shielding member 19 is made of, for example, dark elastomer and resin to be opaque. The light shielding member 19 has a predetermined thickness which is the same as the projection height of the emission portion 17 or a height slightly lower than that. The light shielding member 19 is slightly smaller than the light guide body 11 by the width of the emission portion 17. In addition, the light shielding member 19 does not exist inside the light entrance hole 14.

The light entrance member 15 is made of transparent resin, and is formed separately from the light guide body 11. The light directing member 15 is inserted into the light entrance hole 14 from the downside or the side. A concave reflection portion 15a having an inverse conical shape is formed in the center part of the light directing member 15. The reflection portion 15a having the inverse conical shape has a tapered surface which radially diffuses the light 13 along the surface of the light guide body 11. The reflection portion 15a is formed such that the axis line thereof is aligned with the optical axis of the light source 12.

The light directing member 15 is integrally formed with a light source protection cover 15b covering the surface of the light source 12.

The light source protection cover 15b is attached to the top surface of the base plate casing 12b. In this case, the light source protection cover 15b is made of transparent resin.

The light directing member 15 is integrally formed with the outer surface of the light source protection cover 15b. The light directing member 15 projects upward from the light source protection cover 15b to the light entrance hole 14. The projection light directing member 15 has an approximate cylindrical shape concentric to the light entrance reflection portion 15a of the inversed conical shape. The cylindrical light directing member 15 may have a tapered shape.

The light guide body 11 and the light shielding member 19 are integrally formed (integrated member 51).

The light guide body 11 and the light shielding member 19 are integrally formed by two-color molding or insert molding. In this case, the two-color molding is to mold the light guide body 11 and the light shielding member 19 in turn with one molding machine. The insert molding is to mold the light shielding member 19 integrally with the light guide body 11 by inserting the previously manufactured light guide body 11 into a molding die. The insert molding is also to mold the light shielding member 19 integrally with the light guide body 11 by attaching a molding die for molding the light shielding member 19 to a molding die for molding the light guide body 11. In addition, the light guide body 11 and the light shielding member 19 can be integrated by bonding them.

As described above, the illumination device 10 is provided in the cup holder main body 5 of a container having the bottom 2 and the side wall 3 and capable of housing the drink container 4 such that the bottom 2 is covered by the light shielding member 19. The cup holder 1 is thereby configured.

As described above, the illumination device 10 is provided in the bottom 2 of the cup holder main body 5 to illuminate the side wall 3. However, the illumination device 10 may be provided in the side wall 3 of the cup holder main body 5 to illuminate the bottom 2.

Figure 6A:
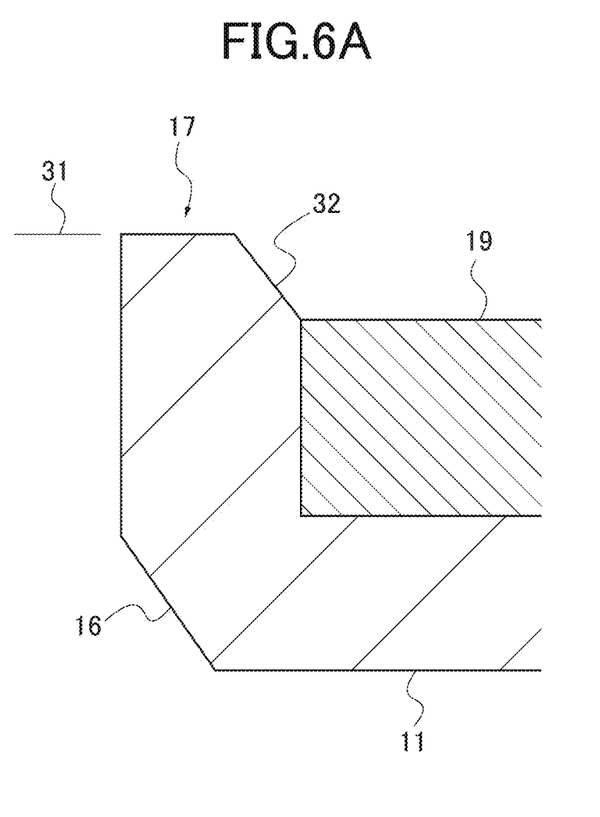
FIG. 6A is a partially enlarged view of FIG. 6 illustrating an anti-dust height.

As illustrated in FIGS. 6, 6A (partially enlarged views), the emission portion 17 has an anti-dust height 31 which is the same height as, or higher than, the surface of the light shielding member 19.

In this case, the anti-dust height 31 is defined based on a relationship with the thickness of the light shielding member 19. More specifically, the anti-dust proof height 31 is set to a height which is the same as the thickness of the light shielding member 19 or a projection height slightly higher than that. In this case, the anti-dust proof height 31 is set to a height higher than the surface of the light shielding member 19 by 0 to 1 mm, preferably, about 0.5 mm. The end portion of the emission portion 17 on the side close to the light shielding member 19 may be chamfered (chamfered portion 32) if necessary.

The emission portion 17 has an emission width 41 for illuminating the side wall, such that the emitted light 13 illuminates the side wall 3 of the cup holder main body 5 from the bottom.

In this case, as illustrated in FIG. 2, the illumination of the side wall 3 from the bottom is an illumination effect of illuminating the lower part of the side wall 3 and of changing illumination which gradually reduces the light volume from the lower part to the upper part in the lower part of the side wall 3 (in FIG. 2, the dark part is illustrated by white, and the bright part is illustrated by black). The emission width 41 is set to about 1 mm, for example, to a range from 0.5 mm to 1.2 mm. When the width of the emission portion 17 is larger than this range, the illumination is changed to planar illumination which highlights the contour of the bottom 2. On the other hand, when the width of the emission portion 17 is smaller than this range, the sufficient light volume of the light 13 for illuminating the side wall 3 from the bottom cannot be obtained. In addition, for example, fluorescent paint may be applied to an illuminated part of the lower part of the side wall.

According to the present embodiment, the following effects can be achieved.

(1) The light directing member 15 is provided separately from the light guide body 11. As the light directing member 15 is thereby separated from the light shielding member 19, the light entering the light guide body 11 via the light directing member 15 is prevented from being disturbed by the light shielding member 19. The light directing member 15 which is the most important for the light entrance is thereby most appropriately formed, and the light can be effectively guided to the emission portion 17 of the light guide body 11 by the light directing member 15.

(2) The light directing member 15 is integrally formed with the light source protection cover 15b. The condensation of the light source 12 can be prevented by covering the light source 12 with the light source protection cover 15b. The light source protection cover 15b can be used as the light entrance member 15 by integrating the light entrance member 15 and the light source protection cover 15b. Thus, the number of components can be reduced to rationalize the structure.

(3) The light guide body 11 and the light shielding member 19 are integrally molded. The number of components and the number of assembling steps can be thereby reduced, so that the costs for the components and the manufacturing costs can be also reduced. The accuracy of the combination of the light guide body 11 and the light shielding member 19 and the accuracy of the emission portion 17 (width) can be improved to further equally illuminate with high quality.

When the light guide body 11 and the light shielding member 19 are integrally molded, the light shielding member 19 is molded after the light guide body 11 is molded. In this case, the surface of the light guide body 11 is roughed by melting resin of the light shielding member 19 to be molded after the light guide body 11. When the light entrance member 15 is integrally provided in the light guide body 11, the light 13 from the light source 12 is diffusely reflected by the roughness of the surface of the light directing member 15 which is the most important for the light entrance, and may not be effectively reflected to the emission portion 17. On the other hand, as described above, the light guide body 11 and the light directing member 15 are separately provided, and the light guide body 11 is only integrally molded with the light shielding member 19, so that the light directing member 15 is prevented from being roughed, and the light 13 from the light source 12 toward the emission portion 17 can be effectively reflected.

(4) The illumination device 10 is provided in the cup holder. The illumination device 10 can therefore illuminate the cup holder. Hereinafter, the specific effect of the illumination device 10 provided in the cup holder is described.

At first, the drink container 4 is placed in the cup holder main body 5 having the bottom 2 and the side wall 3 from the above, so that the cup holder 1 houses the drink container 4.

The transparent light guide body 11 is provided in the cup holder main body 5 to cover the bottom 2. With this configuration, the light 13 from the light source 12 passes through the light entrance member 15 when the light source 12 lights up. Then, the light is reflected by the reflection portion 15a, and enters the light guide body 11 from the light entrance hole 14. After that, the light is reflected, in the light guide body 11, toward the outer circumference of the bottom 2 of the cup holder main body 5, and is reflected upward by the reflection portion 16 in the outer circumference part.

Then, the light is emitted upward along the outer rim part of the bottom 2 of the cup holder main body 5 from the emission portion 17.

The inside of the cup holder 1 can be thereby illuminated. Therefore, the border between the side wall 3 and the bottom 2 and the shape of the side wall 3 can be easily recognized. As the position of the cup holder main body 5 can be easily recognized, the drink container 4 can be easily placed in the cup holder main body 5 and also can be easily taken out from the cup holder main body 5. When the drink container 4 and drink are transparent, these can be illuminated.

In this case, the light diffusion portion 18 is provided on the surface of the emission portion 17. The illumination light 13a emitted from the emission portion 17 is diffused to equalize the illumination. As a result, the illumination can be improved.

The light shielding member 19 that covers the light guide body 11 except the emission portion 17 is provided above the light guide body 11. With this configuration, the illumination can be performed along the border between the side wall 3 and the bottom 2 without illuminating the entire surface of the bottom 2. As a result, the illumination effect can be improved.

As the drink container 4 usually has a tapered shape, the drink container 4 is placed on the light shielding member 19, and the emission portion 17 and the light diffusion portion 18 are disposed along the border (corner portion) between the side wall 3 and the bottom 2 of the cup holder main body 5 to avoid the bottom of the drink container 4. Therefore, the abrasion of the light diffusion portion 18 due to the friction of the drink container 4 can be reduced or prevented.

(5) The emission portion 17 includes the anti-dust height 31 that is the same or greater height as the surface of the light shielding member 19. For example, when the emission portion 17 is lower than the surface of the light shielding member 19, foreign matters such as dust dropped from the bottom of the drink container 4 are deposited above the emission portion 17 which may disturb the effect of the equalization of the illumination light 13a. On the other hand, when the emission portion 17 is higher than the surface of the light shielding member 19, the foreign maters such as dust are not deposited above the emission portion 17 even when the foreign matters such as dust dropped from the bottom of the drink container 4 remain on the light shielding member 19. As a result, the equalization effect of the illumination light 13a can be maintained for a long period of time.

(6) The emission portion 17 is set to the emission width 41 for illuminating the side wall. The side wall 3 of the cup holder main body 5 is illuminated from the bottom by the light 13 emitted from the emission portion 17. As the side wall 3 is thereby illuminated by the surface, the illumination can be easily recognized from the outside, and three-dimensional illumination can be achieved. As the coating of the light 13 in which the light volume gradually reduces upward, a mysterious and high-class illumination effect such as aurora can be achieved. In addition, when the emission portion 17 is set to be wider than the emission width 41, the illumination to the side wall 3 is weakened, and the illumination is changed to the planar illumination in which the contour of the bottom 2 is only highlighted. For this reason, the effect of positively illuminating a wider area of the side wall 3 with the surface cannot be achieved. The three-dimensional illumination and high-class illumination cannot be obtained. In addition, the emission width 41 is set to about 1 mm.

While the embodiment has been described in detail with reference to the drawings, the embodiment is only illustrative and exemplary of the invention. Accordingly, the invention is not limited to the configurations of the embodiment. It will be appreciated that any design change and the like that do not depart from the gist should be included in the invention. It is to be understood that, when multiple configurations are incorporated in each of the embodiment, for example, possible combinations of these configurations are included in the invention without any particular description. It should further be understood that, when multiple embodiments and modifications are disclosed as those of the invention, any possible combinations of configurations among these embodiments and modifications are considered to be included in the invention without any particular description. Moreover, configurations disclosed in the drawings are naturally considered to be included in the invention without any particular description. Further, the term "and/or the like (such as)" is used to indicate that any equivalent is also included. Also, when such a term as "substantially", "about", or "approximately" is used, this means that a value or the like within a range or accuracy which is reasonably acceptable is also included.

DESCRIPTION OF REFERENCE SIGN 1 cup holder
2 bottom
3 side wall
4 drink container
5 cup holder main body
11 light guide body
12 light source
13 light
14 light entrance hole
15 light entrance member
15b light source protection cover
17 emission portion
19 light shielding member

CROSS-REFERENCE TO RELATED APPLICATION

The present application is based on and claims priority to Japanese Patent Application No. 2015-083481, filed on Apr. 15, 2015, the disclosure of which is hereby incorporated by reference in its entirety.

The invention claimed is:

1. An illumination device for a vehicle, comprising:
a base plate casing;
a light source housed within the base plate casing;
a light guide body including a light entrance hole into which light from the light source enters, an outer surface, and an emission portion in an outer rim part of the light guide body, the emission portion being configured to guide the light from the light entrance hole toward the outer surface;
a light shielding member covering a portion of the outer surface of the light guide body, the portion of the outer surface covered by the light shielding member excluding the emission portion; and
a light directing member attached to the base plate casing, the light directing member being disposed in the light entrance hole and spaced apart from the light guide body, and being configured to reflect the light from the light source toward the emission portion.

2. The illumination device according to claim 1, wherein the light directing member has an integral light source protection cover attached to a top surface of the base plate casing to cover a surface of the light source.

3. The illumination device according to claim 1, wherein the light guide body and the light shielding member are a one-piece integrated member.

4. A cup holder comprising a cup holder main body including a bottom and a side wall, the cup holder main body capable of housing a drink container, and
wherein the cup holder includes the illumination device according to claim 1,
wherein the illumination device is provided in the cup holder main body such that the bottom is covered by the light shielding member.

5. The illumination device according to claim 1, wherein the outer surface is a horizontal top surface of the light guide body.

6. The illumination device according to claim 1, wherein the emission portion has an anti-dust height higher than a surface of the light shielding member by a distance no more than 1 mm.

7. The illumination device according to claim 1, wherein the light guide body has a reflection portion configured to reflect the light toward the emission portion, the reflection portion being positioned under the emission portion and configured to reflect the light from the light source at an incident angle in a range of 39° to 67.5°.

* * * * *